(12) United States Patent
Wagner

(10) Patent No.: US 10,393,113 B2
(45) Date of Patent: Aug. 27, 2019

(54) CONNECTING ROD AND CROSSHEAD ASSEMBLY FOR ENHANCING THE PERFORMANCE OF A RECIPROCATING PUMP

(71) Applicant: S.P.M. Flow Control, Inc., Fort Worth, TX (US)

(72) Inventor: Bryan Wagner, Fort Worth, TX (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 270 days.

(21) Appl. No.: 15/185,143

(22) Filed: Jun. 17, 2016

(65) Prior Publication Data
US 2016/0369792 A1 Dec. 22, 2016

Related U.S. Application Data

(60) Provisional application No. 62/181,463, filed on Jun. 18, 2015.

(51) Int. Cl.
*F04B 53/14* (2006.01)
*F16C 5/00* (2006.01)
(Continued)

(52) U.S. Cl.
CPC .............. *F04B 53/147* (2013.01); *F04B 1/02* (2013.01); *F04B 9/045* (2013.01); *F04B 53/006* (2013.01);
(Continued)

(58) Field of Classification Search
CPC .. F04B 53/144; F04B 53/147; F04B 39/0022; F16C 5/00
See application file for complete search history.

(56) References Cited

U.S. PATENT DOCUMENTS 2,418,901 A * 4/1947 Read ........................ F16C 5/00
184/6.5
3,129,966 A 4/1964 Blank
(Continued)

FOREIGN PATENT DOCUMENTS

| CN | 204200827 | 3/2015 |
|---|---|---|
| GB | 886870 | 1/1962 |
| GB | 1178682 | 1/1970 |

OTHER PUBLICATIONS

International Search Report and Written Opinion issued by the ISA/US regarding international application No. PCT/US16/37994, dated Nov. 2, 2016, 10 pages.

*Primary Examiner* — Thomas E Lazo
*Assistant Examiner* — Michael Quandt
(74) *Attorney, Agent, or Firm* — Foley & Lardner LLP

(57) ABSTRACT

A method and apparatus for a reciprocating pump assembly, including a crosshead and a connecting rod. The crosshead includes a main body having a cylindrical bore formed therethrough and defining a bearing surface, and a window formed through the main body and into the cylindrical bore. The connecting rod includes a small end disposed within the cylindrical bore and a beam portion extending through the window and being connected to the small end. In an exemplary embodiment, a bearing including a tubular body and a cutout is disposed within the cylindrical bore. In another exemplary embodiment, a clamp engages both the main body of the crosshead and the respective opposing end portions of the small end, thus reducing axial displacement of the small end relative to the crosshead.

18 Claims, 10 Drawing Sheets

(51) Int. Cl.
- *F04B 53/00* (2006.01)
- *F04B 53/16* (2006.01)
- *F04B 1/02* (2006.01)
- *F04B 9/04* (2006.01)
- *F04B 53/22* (2006.01)

(52) U.S. Cl.
CPC .............. *F04B 53/16* (2013.01); *F04B 53/22* (2013.01); *F16C 5/00* (2013.01)

(56) References Cited

U.S. PATENT DOCUMENTS

| | | | |
|---|---|---|---|
| 4,266,443 A | 5/1981 | McWhorter | |
| 7,610,847 B2* | 11/2009 | McKelroy | F04B 53/144 92/140 |
| 8,376,723 B2* | 2/2013 | Kugelev | F04B 53/147 417/568 |
| 2010/0242720 A1* | 9/2010 | Matzner | F04B 53/147 92/139 |
| 2015/0132157 A1* | 5/2015 | Whaley | F04B 53/14 417/321 |

* cited by examiner

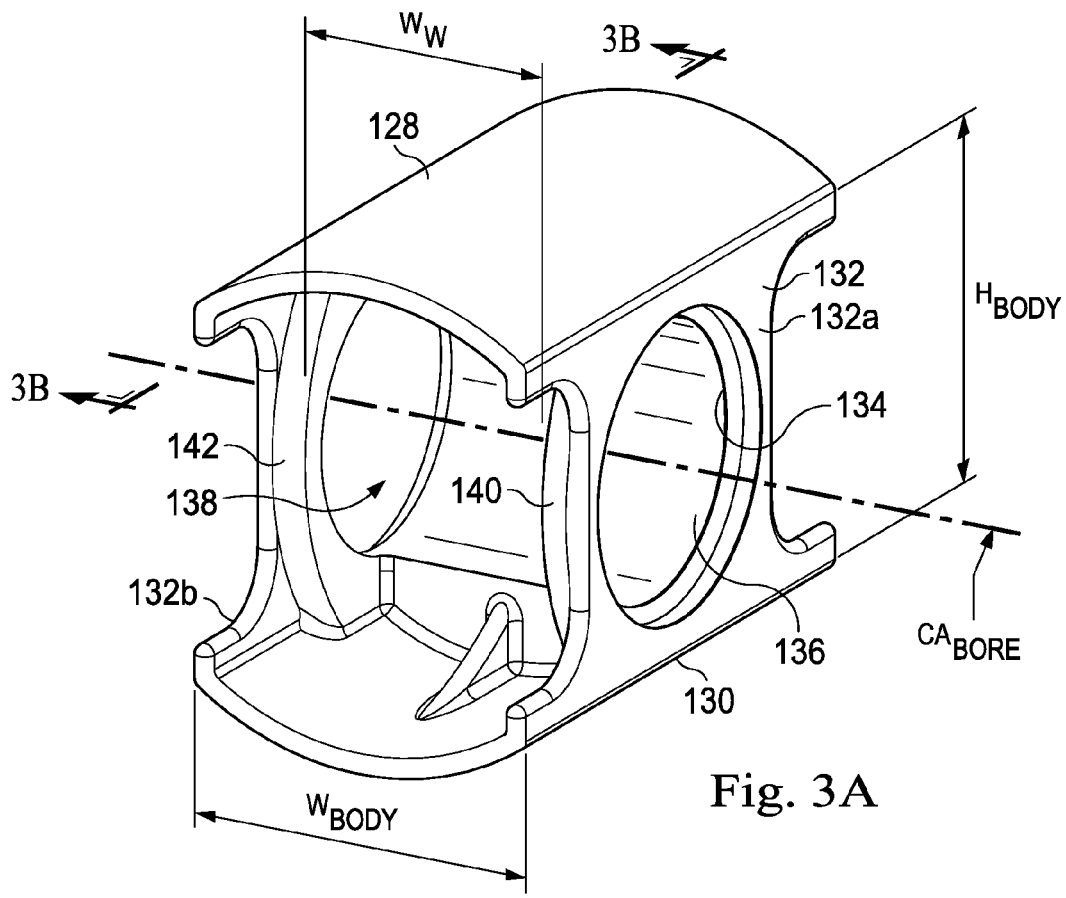
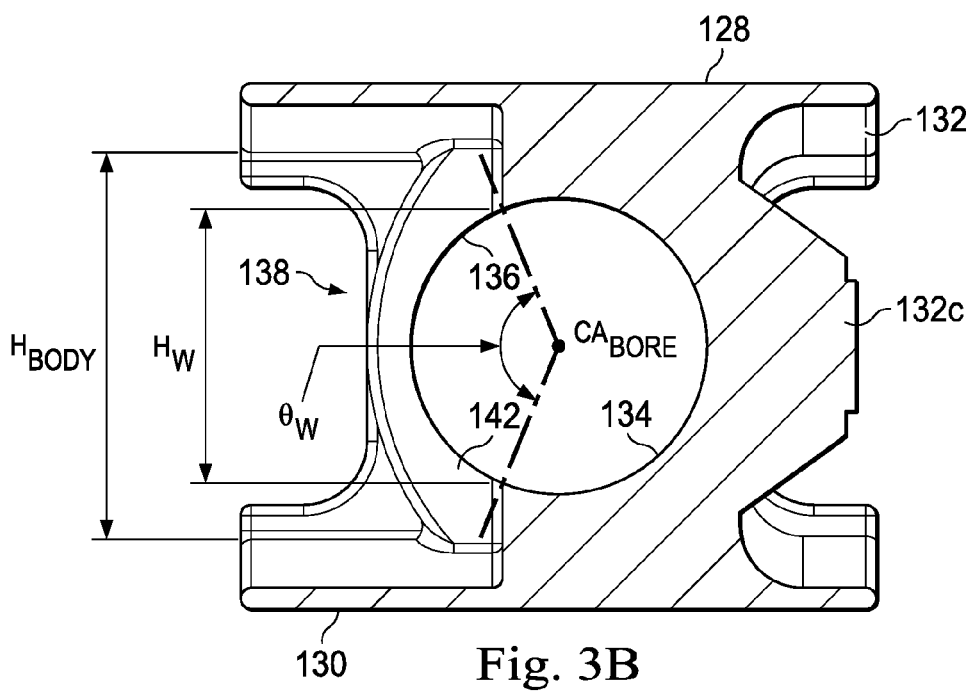
Fig. 3A
Fig. 3B

CONNECTING ROD AND CROSSHEAD ASSEMBLY FOR ENHANCING THE PERFORMANCE OF A RECIPROCATING PUMP

CROSS-REFERENCE TO RELATED APPLICATION

This application claims the benefit of the filing date of, and priority to, U.S. Application No. 62/181,463, filed Jun. 18, 2015, the entire disclosure of which is hereby incorporated herein by reference.

TECHNICAL FIELD

The present disclosure relates generally to a reciprocating pump and, more specifically, to enhancing the performance, reliability, and/or capacity of the reciprocating pump by equipping the reciprocating pump with an improved connecting rod and crosshead assembly according to the present disclosure.

BACKGROUND OF THE DISCLOSURE

Reciprocating pumps are used in connection with various oilfield operations such as, for example, cementing, acidizing, or fracturing of a subterranean wellbore. During such operations, these reciprocating pumps are often subject to short and frequent duty cycles, and are required to deliver a fluid or slurry to the wellbore at pressures up to 20,000 psi. An exemplary reciprocating pump for oilfield operations includes a fluid end coupled to a power end. The power end includes a motor connected to a crank shaft. The crank shaft includes a number of crank throws. The fluid end includes a corresponding number of cylinders arranged transversely thereacross, each defining a respective plunger bore. The plunger bores are each in fluid communication with a suction manifold and a discharge manifold. The fluid end further includes plungers, each of which is received by, and extends within, a corresponding one of the plunger bores. The plungers are each mechanically coupled to respective ones of the crank throws by way of a mechanical linkage, which linkage includes a connecting rod and a crosshead. The crosshead reciprocates within a guide member. The connecting rod couples a respective one of the crank throws to the crosshead. Further, the crosshead is coupled to a respective one of the plungers by way of a pony rod. In operation, the motor rotates the crankshaft, which, in turn, drives the connecting rod, the crosshead, and the pony rod, causing the plungers to reciprocate within corresponding ones of the plunger bores. As the plungers reciprocate, fluid is drawn into the plunger bores from the suction manifold and, thereafter, discharged from the plunger bores into the discharge manifold. The performance, reliability, and/or load bearing capacity of the mechanical linkages, i.e., the connecting rods and the crossheads, is often an issue in the field due to the extreme duty cycles of reciprocating pumps employed in oilfield operations. Failure of these components may cause critical downtime of the reciprocating pump during oilfield operations and/or inflict damage to well tools or other components on the well site.

SUMMARY

In a first aspect, there is provided an apparatus for a reciprocating pump assembly, the apparatus including a crosshead including a main body, a cylindrical bore formed through the main body and defining a bearing surface extending about a first axis, and a window formed in the main body transversely to the first axis; a bearing including a tubular body disposed within the cylindrical bore, the tubular body extending about a second axis and defining an interior passage, and a cutout formed in the tubular body transversely to the third axis; a connecting rod including a small end disposed within the interior passage, the small end defining opposing end portions and extending about a third axis, and a beam portion extending through the window and the cutout, the beam portion being connected to the small end.

In an exemplary embodiment, at the location of the cutout, the bearing extends for a first angle about the interior passage, the first angle being greater than 180 degrees and less than 360 degrees.

In another exemplary embodiment, at the location of the window, the bearing surface of the crosshead extends for a second angle about the cylindrical bore, the second angle being approximately equal to the first angle.

In yet another exemplary embodiment, the apparatus further includes a clamp, the clamp including a pair of plates adapted to engage both the main body of the crosshead and the respective opposing end portions of the small end, and a tensioner connected to the plates and adapted to apply tension therebetween; wherein, when the tensioner applies tension between the plates, the clamp is adapted to prevent, or at least reduce, axial displacement of the small end within the bearing and relative to the crosshead.

In certain exemplary embodiments, the connecting rod further includes a big end connected to the beam portion and defining a cylindrical inner surface, the big end being split along a plane into a seat portion and a cap portion; wherein the seat portion is integrally formed with the beam portion; wherein the plane forms an oblique angle with the beam portion; and wherein the cap portion is adapted to be connected to the seat portion along the plane.

In an exemplary embodiment, the crosshead further includes a pair of struts formed on opposing sides of the window, the struts partially defining the bearing surface and being integrally formed with the main body of the crosshead.

In another exemplary embodiment, the cutout of the bearing is substantially aligned with the window of the crosshead so that the tubular body of the bearing substantially covers the bearing surface of the crosshead.

In yet another exemplary embodiment, an interference fit is established between the bearing surface and the bearing; wherein the bearing is disposed radially between the bearing surface of the crosshead and the small end of the connecting rod, thereby providing lubrication and/or wear resistance between the bearing surface and the small end; and wherein the first, second, and third axes are substantially coaxial with one another.

In a second aspect, there is provided an apparatus for a reciprocating pump assembly, the apparatus including a crosshead including a main body, a cylindrical bore formed through the main body and defining a bearing surface extending about a first axis, and a window formed in the main body transversely to the first axis; a connecting rod including a small end disposed within the cylindrical bore, the small end defining opposing end portions and extending about a second axis, and a beam portion extending through the window, the beam portion being connected to the small end; and a clamp including a pair of plates engaging both the main body of the crosshead and the respective opposing end portions of the small end, and a tensioner connected to the plates and adapted to apply tension therebetween; wherein, when the tensioner applies tension between the plates, the clamp is adapted to prevent, or at least reduce, axial displacement of the small end relative to the crosshead.

In an exemplary embodiment, at the location of the window, the bearing surface of the crosshead extends for a first angle about the cylindrical bore, the first angle being greater than 180 degrees and less than 360 degrees.

In another exemplary embodiment, the apparatus further includes a bearing including a tubular body disposed within the cylindrical bore, the tubular body extending about a third axis and defining an interior passage; and a cutout formed in the tubular body transversely to the third axis.

In yet another exemplary embodiment, at the location of the cutout, the bearing extends for a second angle about the interior passage, the second angle being approximately equal to the first angle.

In certain exemplary embodiments, the cutout of the bearing is substantially aligned with the window of the crosshead so that the tubular body of the bearing substantially covers the bearing surface of the crosshead.

In an exemplary embodiment, an interference fit is established between the bearing surface and the bearing; wherein the bearing is disposed radially between the bearing surface of the crosshead and the small end of the connecting rod, thereby providing lubrication and/or wear resistance between the bearing surface and the small end; and wherein the first, second, and third axes are substantially coaxial with one another.

In another exemplary embodiment, the crosshead further includes a pair of struts formed on opposing sides of the window, the struts partially defining the bearing surface and being integrally formed with the main body of the crosshead.

In yet another exemplary embodiment, the connecting rod further includes a big end connected to the beam portion and defining a cylindrical inner surface, the big end being split along a plane into a seat portion and a cap portion; wherein the seat portion is integrally formed with the beam portion; wherein the plane forms an oblique angle with the beam portion; and wherein the cap portion is adapted to be connected to the seat portion along the plane.

In a third aspect, there is provided a reciprocating pump assembly including a fluid end including a plunger bore, and a plunger adapted to reciprocate within the plunger bore; a power end including a tubular guide member, a crank shaft adapted to rotate about a first axis, and a crank throw connected to the crankshaft and offset from the first axis; and a mechanical linkage coupling the power end to the fluid end, the mechanical linkage including a crosshead including a main body coupled to the plunger and adapted to reciprocate within the tubular guide member, a cylindrical bore formed through the main body and defining a bearing surface extending about a second axis, and a window extending perpendicular to the second axis, through the main body, and into the cylindrical bore; and a connecting rod including a small end disposed within the cylindrical bore, the small end defining opposing end portions and extending about a third axis, a beam portion extending through the window and connected to the small end, and a big end connected to the beam portion, the big end coupling the connecting rod to the crank throw.

In an exemplary embodiment, at the location of the window, the bearing surface of the crosshead extends for a first angle about the cylindrical bore, the first angle being greater than 180 degrees and less than 360 degrees.

In another exemplary embodiment, the assembly further includes a bearing including a tubular body disposed within the cylindrical bore, the tubular body extending about a fourth axis and defining an interior passage; and a cutout extending perpendicular to the fourth axis, through the tubular body, and into the interior passage.

In yet another exemplary embodiment, at the location of the cutout, the bearing extends for a second angle about the interior passage, the second angle being approximately equal to the first angle.

In certain exemplary embodiments, the cutout of the bearing is substantially aligned with the window of the crosshead so that the tubular body of the bearing substantially covers the bearing surface of the crosshead.

In an exemplary embodiment, an interference fit is established between the bearing surface of the crosshead and the tubular body of the bearing; wherein the bearing is disposed radially between the bearing surface of the crosshead and the small end of the connecting rod, thereby providing lubrication and/or wear resistance between the bearing surface and the small end; and wherein the second, third, and fourth axes are substantially coaxial with one another.

In another exemplary embodiment, the apparatus further includes a clamp, the clamp including a pair of plates adapted to engage both the main body of the crosshead and the respective opposing end portions of the small end; and a tensioner connected to the plates and adapted to apply tension therebetween; wherein, when the tensioner applies tension between the plates, the clamp is adapted to prevent, or at least reduce, axial displacement of the small end within the bearing and relative to the crosshead.

In yet another exemplary embodiment, the big end defines a cylindrical inner surface that engages the crank throw, the big end being split along a plane into a seat portion and a cap portion; wherein the seat portion is integrally formed with the beam portion; wherein the plane forms an oblique angle with the beam portion; and wherein the cap portion is adapted to be connected to the seat portion along the plane.

In certain exemplary embodiments, the crosshead further includes a pair of struts formed on opposing sides of the window, the struts partially defining the bearing surface and being integrally formed with the main body of the crosshead.

In a fourth aspect, there is provided a method of assembling a crosshead and a connecting rod for a reciprocating pump, the method including providing the crosshead, the crosshead including a main body, a cylindrical bore formed through the main body and defining a bearing surface extending about a first axis, and a window formed in the main body transversely to the first axis; providing the connecting rod, the connecting rod including a small end extending about a second axis, and a beam portion adapted to be connected to the small end; positioning the small end of the connecting rod within the cylindrical bore of the crosshead; and connecting the beam portion to the small end of the connecting rod through the window of the crosshead.

In an exemplary embodiment, positioning the small end of the connecting rod within the cylindrical bore of the crosshead includes establishing a clearance fit between the small end of the connecting rod and the bearing surface of the crosshead so the small end is permitted to rotate within the cylindrical bore while remaining engaged with the bearing surface.

In another exemplary embodiment, at the location of the window, the bearing surface of the crosshead extends more than 180 degrees, but less than 360 degrees, about the first axis.

In yet another exemplary embodiment, the method further includes providing a bearing, the bearing including a tubular body disposed within the cylindrical bore, the tubular body extending about a third axis and defining an interior passage; and a cutout formed in the tubular body transversely to the third axis.

In certain exemplary embodiments, at the location of the cutout, the bearing extends for a second angle about the interior passage, the second angle being approximately equal to the first angle.

In an exemplary embodiment, the method further includes a step for installing the bearing within the cylindrical bore of the crosshead, the step including positioning the bearing within the cylindrical bore so the cutout of the bearing is substantially aligned with the window of the crosshead; and engaging the tubular body of the bearing with the bearing surface of the crosshead to prevent, or at least obstruct, movement of the bearing relative to the crosshead.

In another exemplary embodiment, positioning the small end of the connecting rod within the cylindrical bore of the crosshead includes positioning the small end within the interior passage of the tubular body of the bearing so the first, second, and third axes are substantially coaxial with one another; and establishing a clearance fit between the small end of the connecting rod and the bearing so the small end is permitted to rotate within the sleeve bearing while remaining engaged therewith.

In yet another exemplary embodiment, the method further includes providing a clamp, the clamp including a pair of plates adapted to engage both the main body of the crosshead and the respective opposing end portions of the small end; and a tensioner connected to the plates and adapted to apply tension therebetween.

In certain exemplary embodiments, the small end defines opposing end portions with an opening formed therebetween along the second axis; wherein the method further includes a step for installing the clamp, the step including positioning the tensioner through the opening of the of the small end; connecting the tensioner to the end plates, the end plates engaging both the main body portion of the crosshead and the respective opposing end portions of the small end; and applying tension between the end plates with the tensioner; and wherein installing the clamp prevents, or at least reduces, axial displacement of the small end relative to the crosshead.

In a fifth aspect, there is provided a kit for a reciprocating pump assembly, the kit including a crosshead including a main body, a cylindrical bore formed through the main body and defining a bearing surface extending about a first axis, a window formed in the main body transversely to the first axis, and a pair of struts located on opposing sides of the window, the struts partially defining the bearing surface; a bearing including a tubular body adapted to be disposed within the cylindrical bore, the tubular body extending about a second axis and defining an interior passage, and a cutout formed in the tubular body transversely to the third axis; and a connecting rod including a small end adapted to be disposed within the interior passage, the small end extending about a third axis, and a beam portion adapted to be connected to the small end and adapted to extend through the window and the cutout.

In an exemplary embodiment, at the location of the cutout, the bearing extends for a first angle about the interior passage, the first angle being greater than 180 degrees and less than 360 degrees.

In another exemplary embodiment, at the location of the window, the bearing surface of the crosshead extends for a second angle about the cylindrical bore, the second angle being approximately equal to the first angle.

In yet another exemplary embodiment, when the bearing is disposed within the cylindrical bore, the cutout of the bearing is adapted to be substantially aligned with the window of the crosshead so that the tubular body of the bearing substantially covers the bearing surface of the crosshead.

In certain exemplary embodiments, the kit further includes a clamp, the clamp including a pair of plates adapted to engage both the main body of the crosshead and the respective opposing end portions of the small end; and a tensioner adapted to connect to the plates and apply tension therebetween; wherein, when the tensioner applies tension between the plates, the clamp is adapted to prevent, or at least reduce, axial displacement of the small end within the bearing and relative to the crosshead.

In an exemplary embodiment, the connecting rod further includes a big end connected to the beam portion and defining a cylindrical inner surface, the big end being split along a plane into a seat portion and a cap portion; wherein the seat portion is integrally formed with the beam portion; wherein the plane forms an oblique angle with the beam portion; and wherein the cap portion is adapted to be connected to the seat portion along the plane.

In another exemplary embodiment, the crosshead further includes a pair of struts formed on opposing sides of the window, the struts partially defining the bearing surface and being integrally formed with the main body of the crosshead.

In yet another exemplary embodiment, the small end is disposed within the internal passage and the bearing is disposed within the cylindrical bore, the bearing is disposed radially between the bearing surface of the crosshead and the small end of the connecting rod, an interference fit is established between the bearing surface and the bearing, and the first, second, and third axes are substantially coaxial with one another.

In certain exemplary embodiments, the beam portion is adapted to connect to the small end through the window and the cutout when the small end is disposed within the interior passage.

In a sixth aspect, there is provided an apparatus for a reciprocating pump assembly, the apparatus including a crosshead including: a main body; a cylindrical bore formed through, and at least partially defining a bearing surface in, the main body, the bearing surface extending about a first axis; and a window formed in the main body transversely to the first axis; and a connecting rod including a small end defining opposing end portions and adapted to extend within the cylindrical bore, the small end extending about a second axis, and a beam portion adapted to be connected to the small end, the beam portion and the small end being separately formed; wherein, when the small end extends within the cylindrical bore and the beam portion is connected to the small end, the first and second axes are substantially coaxial and the beam portion extends through the window.

In an exemplary embodiment, the beam portion is adapted to be connected to the small end using one or more fasteners.

In another exemplary embodiment, the crosshead further includes a pair of struts integrally formed with the main body and partially defining the bearing surface, the struts being formed on opposing sides of the window.

In yet another exemplary embodiment, at the location of the window, the bearing surface of the crosshead extends more than 180 degrees, but less than 360 degrees, about the first axis.

In certain exemplary embodiments, the apparatus further includes a bearing adapted to extend within the cylindrical bore, the bearing including a tubular body defining an interior passage and extending about a third axis, and a cutout formed in the tubular body transversely to the third axis, the cutout being adapted to be substantially aligned with the window so that the tubular body substantially covers the bearing surface; wherein, when the bearing and the small end extend within the cylindrical bore, the cutout is substantially aligned with the window, and the beam portion is connected to the small end: the beam portion extends through both the cutout and the window; the bearing is disposed radially between the bearing surface and the small end, thus providing lubrication and/or wear resistance therebetween; and the first, second, and third axes are substantially coaxial.

In an exemplary embodiment, at the location of the cutout, the tubular body of the bearing extends more than 180 degrees, but less than 360 degrees, about the third axis.

In another exemplary embodiment, the apparatus further includes a clamp, the clamp including a pair of plates adapted to engage both the main body of the crosshead and the respective opposing end portions of the small end, and a tensioner adapted to be connected to, and to apply tension between, the plates; wherein, when the plates engage both the main body of the crosshead and the opposing end portions of the small end, and the tensioner is connected to, and applies tension between, the plates, the clamp prevents, or at least reduces, axial displacement of the small end relative to the crosshead.

In a seventh aspect, there is provided a method of assembling a crosshead and a connecting rod for a reciprocating pump, the method including providing the crosshead, the crosshead including: a main body; a cylindrical bore formed through, and at least partially defining a bearing surface in, the main body, the bearing surface extending about a first axis; and a window formed in the main body transversely to the first axis; positioning a small end of the connecting rod within the cylindrical bore, the small end defining opposing end portions and extending about a second axis; and connecting a beam portion of the connecting rod to the small end, the beam portion and the small end being separately formed; wherein, when the small end is positioned within the cylindrical bore and the beam portion is connected to the small end, the first and second axes are substantially coaxial and the beam portion extends through the window.

In an exemplary embodiment, connecting the beam portion to the small end of the connecting rod including connecting the beam portion to the small end using one or more fasteners.

In another exemplary embodiment, the crosshead further includes a pair of struts integrally formed with the main body and partially defining the bearing surface, the struts being formed on opposing sides of the window.

In yet another exemplary embodiment, at the location of the window, the bearing surface of the crosshead extends more than 180 degrees, but less than 360 degrees, about the first axis.

In certain exemplary embodiments, the method further includes positioning a bearing within the cylindrical bore so that: a tubular body of the bearing is engaged with the bearing surface of the crosshead, the tubular body defining an interior passage and extending about a third axis; and a cutout of the bearing is substantially aligned with the window of the crosshead, the cutout formed in the tubular body transversely to the third axis; wherein, when the bearing and the small end are positioned within the cylindrical bore and the beam portion is connected to the small end: the beam portion extends through both the cutout and the window; the bearing is disposed radially between the bearing surface and the small end, thus providing lubrication and/or wear resistance therebetween; and the first, second, and third axes are substantially coaxial.

In an exemplary embodiment, at the location of the cutout, the tubular body of the bearing extends more than 180 degrees, but less than 360 degrees, about the third axis.

In another exemplary embodiment, the method further includes connecting a clamp to the crosshead and the connecting rod so that: a pair of plates of the clamp are engaged with both the main body of the crosshead and the respective opposing end portions of the small end; and a tensioner of the clamp is connected to, and applies tension between, the plates so that the clamp prevents, or at least reduces, axial displacement of the small end relative to the crosshead.

In an eighth aspect, there is provided a reciprocating pump assembly, including a fluid end including a plunger bore and a plunger adapted to reciprocate within the plunger bore; a power end including a tubular guide member, a crank shaft adapted to rotate about a first axis, and a crank throw offset from the first axis and connected to the crankshaft; and a mechanical linkage operably coupling the power end to the fluid end, the mechanical linkage including: a crosshead including: a main body; a cylindrical bore formed through, and at least partially defining a bearing surface in, the main body, the bearing surface extending about a first axis; and a window formed in the main body transversely to the first axis; and a connecting rod including a small end defining opposing end portions and extending within the cylindrical bore, the small end extending about a second axis, and a beam portion connected to the small end, the beam portion and the small end being separately formed; wherein the beam portion extends through the window and the first and second axes are substantially coaxial.

In an exemplary embodiment, the beam portion is connected to the small end using one or more fasteners.

In another exemplary embodiment, the connecting rod further includes a big end connected to the beam portion and split along a plane into a seat portion and a cap portion, the seat and cap portions together defining a cylindrical inner surface that engages the crank throw, the seat portion being integrally formed with the beam portion, the cap portion being connected to the seat portion along the plane, and the plane defining an oblique angle with the beam portion.

In yet another exemplary embodiment, the crosshead further includes a pair of struts integrally formed with the main body and partially defining the bearing surface, the struts being formed on opposing sides of the window.

In certain exemplary embodiments, the reciprocating pump assembly further includes a bearing adapted to extend within the cylindrical bore, the bearing including a tubular body defining an interior passage and extending about a third axis, and a cutout formed in the tubular body transversely to the third axis, the cutout being adapted to be substantially aligned with the window so that the tubular body substantially covers the bearing surface; wherein, when the bearing and the small end extend within the cylindrical bore, the cutout is substantially aligned with the window, and the beam portion is connected to the small end: the beam portion extends through both the cutout and the window; the bearing is disposed radially between the bearing surface and the small end, thus providing lubrication and/or wear resistance therebetween; and the first, second, and third axes are substantially coaxial.

In an exemplary embodiment, the reciprocating pump assembly further includes a clamp, the clamp including: a pair of plates engaging both the main body of the crosshead and the respective opposing end portions of the small end, and a tensioner connected to, and applying tension between, the plates to prevent, or at least reduce, axial displacement of the small end relative to the crosshead.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 3A is a perspective view of the crosshead of FIG. 1B, according to an exemplary embodiment.

FIG. 3B is a side cross-sectional view of the crosshead of FIGS. 1B and 3A, according to an exemplary embodiment.

DETAILED DESCRIPTION

Figure 1A:
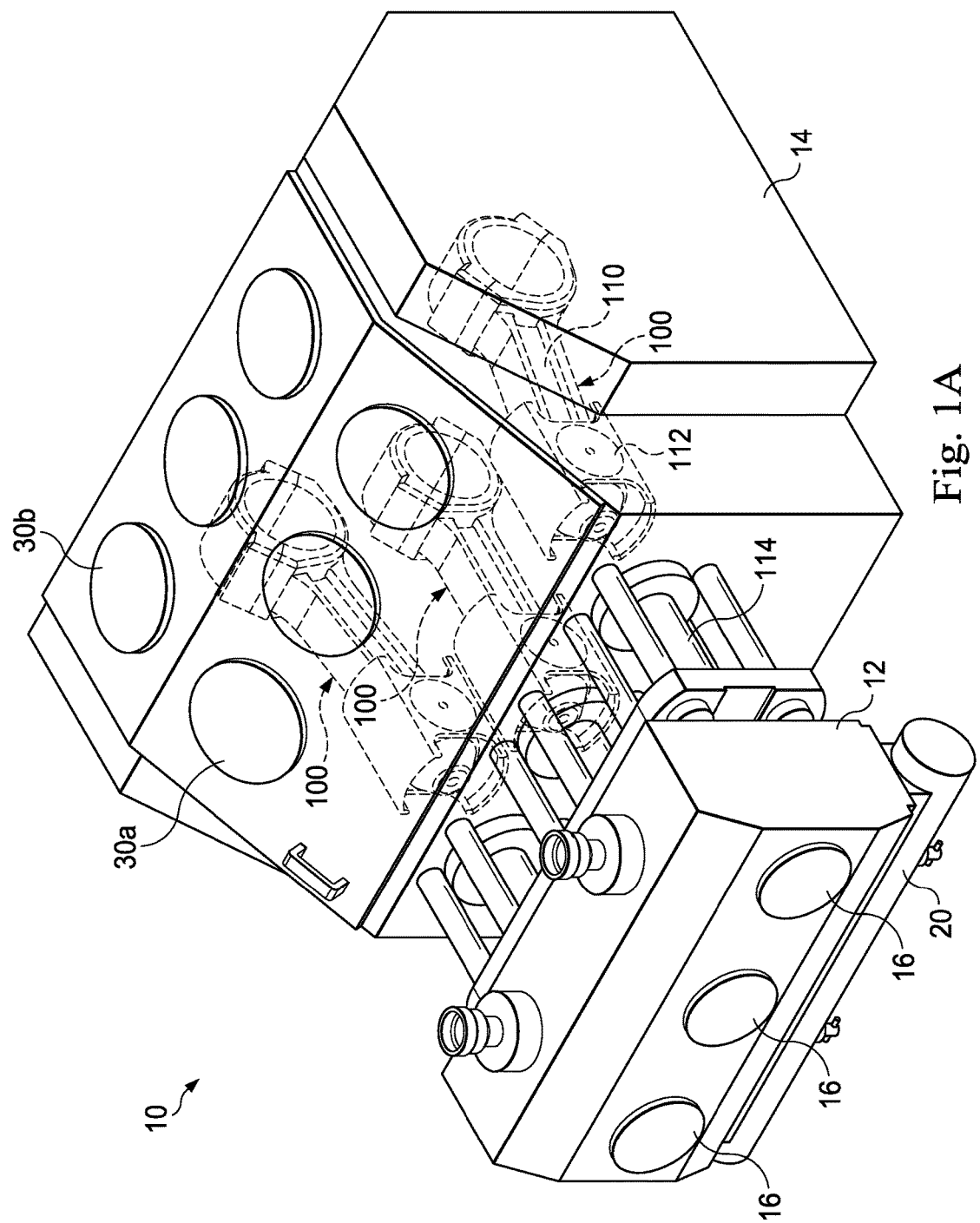
FIG. 1A is a diagrammatic illustration of a reciprocating pump assembly including a power end, a fluid end, and a mechanical linkage coupling the power end to the fluid end, according to an exemplary embodiment.
Figure 1B:
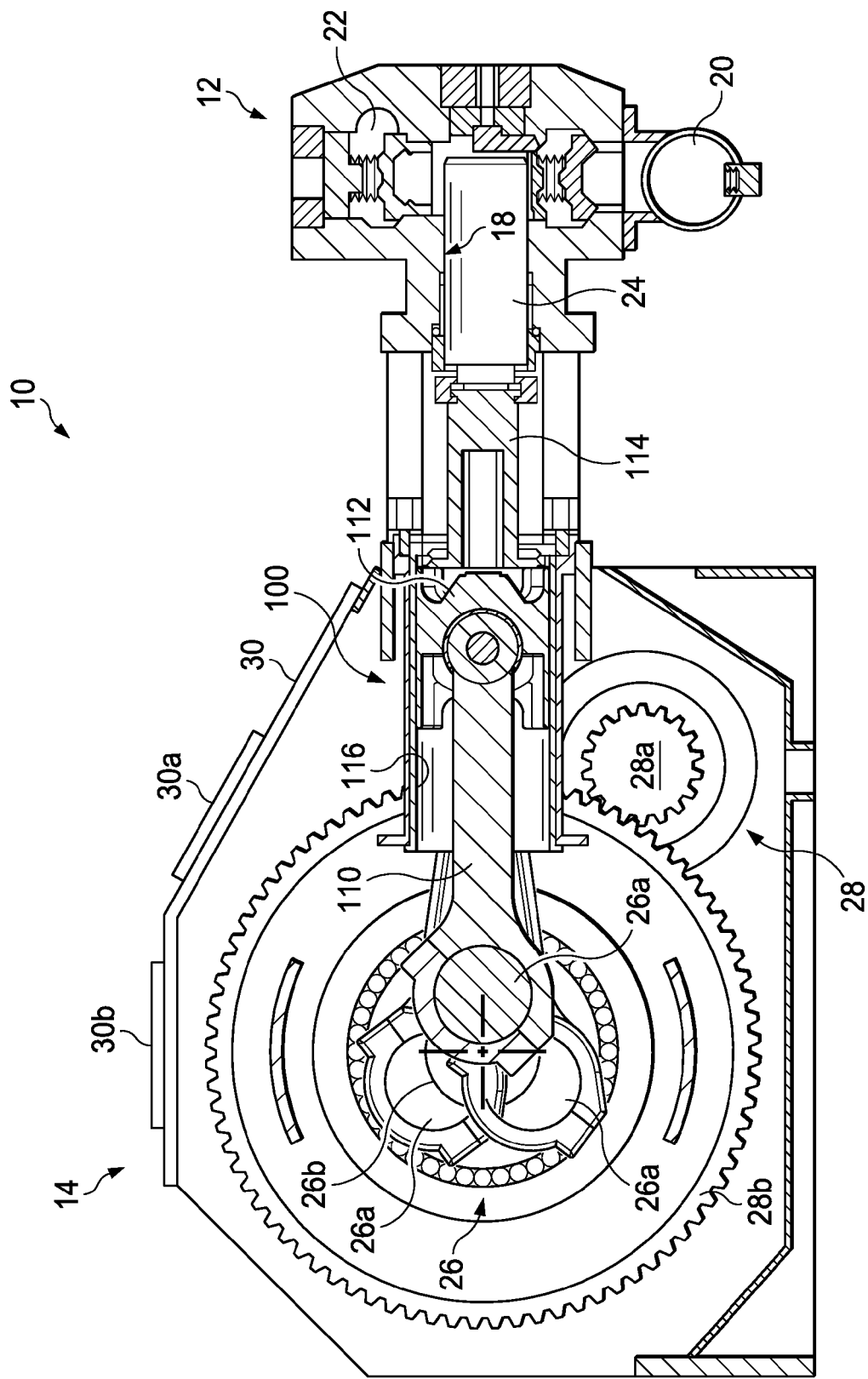
FIG. 1B is an elevational cross-section view of the reciprocating pump assembly of FIG. 1A, the mechanical linkage including a connecting rod and a crosshead, according to an exemplary embodiment.

In an exemplary embodiment, as illustrated in FIGS. 1A and 1B, a reciprocating pump assembly is schematically illustrated and generally designated by the reference numeral 10. The reciprocating pump assembly 10 includes a fluid end 12 and a power end 14. In several exemplary embodiments, the reciprocating pump assembly 10 is a triplex with the fluid end 12 having a set of three cylinders 16, each including a plunger bore 18. Although the reciprocating pump assembly 10 is depicted in FIG. 1 as a triplex, the reciprocating pump assembly 10 may include any number of cylinders 16 such as, for example, one cylinder, two cylinders (duplex), four cylinders (quadriplex), five cylinders (quintuplex), or more. The cylinders 16 and their respective plunger bores 18 are arranged transversely across the fluid end 12. The plunger bores 18 are each in fluid communication with a suction manifold 20 and a discharge manifold 22. The fluid end 12 further includes plungers 24 that are received by, and extend within, the respective plunger bores 18. Each plunger 24 is adapted to reciprocate within the corresponding plunger bore 18 during the operation of the reciprocating pump assembly 10.

The power end 14 of the reciprocating pump assembly 10 includes a crankshaft 26 that is mechanically coupled to a motor (not shown), either directly or by way of a gear train 28. The gear train 28 includes a pinion 28a mechanically connected to the motor (not shown) and a bull gear 28b mechanically connected to the crankshaft 26. The gear teeth of the pinion 28a mesh with the gear teeth of the bull gear 28b, thereby transmitting torque therebetween. The crankshaft 26 includes crank throws 26a that are connected to a main shaft 26b. The crank throws 26a are offset from the rotational axis of the crankshaft 26, i.e., the central axis of the main shaft 26b. Each crank throw 26a is mechanically coupled to a respective one of the plungers 24 by way of a mechanical linkage 100. The motor (not shown) is operable to rotate the crankshaft 26 via the gear train 28. The crankshaft 26, in turn, is operable to drive the mechanical linkages 100, causing the plungers 24 to reciprocate within corresponding ones of the plunger bores 18. Each mechanical linkage 100 includes a connecting rod 110 and a crosshead 112. A pony rod 114 is used to couple each of the mechanical linkages 100 to the corresponding plungers 24. Each crosshead 112 is disposed in a tubular guide member 116, within which the crosshead 112 is adapted to reciprocate. Each connecting rod 110 couples a respective one of the crank throws 26a to a respective one of the crossheads 112. Further, each pony rod 114 connects a respective one the crossheads 112 to a respective one of the plungers 24. The crankshaft 26 and the mechanical linkages 100 are disposed within a power end housing 30. The power end housing 30 includes multiple portholes that allow access to the power end 14 for maintenance and/or repair. The portholes include access covers such as, for example, front access covers 30a and rear access covers 30b, which are removable to allow for maintenance and repair of the power end 14. The structure of the mechanical linkages 100 will be discussed in further detail below.

As indicated above, each of the mechanical linkages 100 includes respective ones of the connecting rods 110 and the crossheads 112. The mechanical linkages 100 are substantially identical to one another. Therefore, in connection with the remaining Figures, only one of the mechanical linkages 100, including the corresponding connecting rod 110 and crosshead 112, will be described in detail below using the foregoing reference numerals.

Figure 2A:
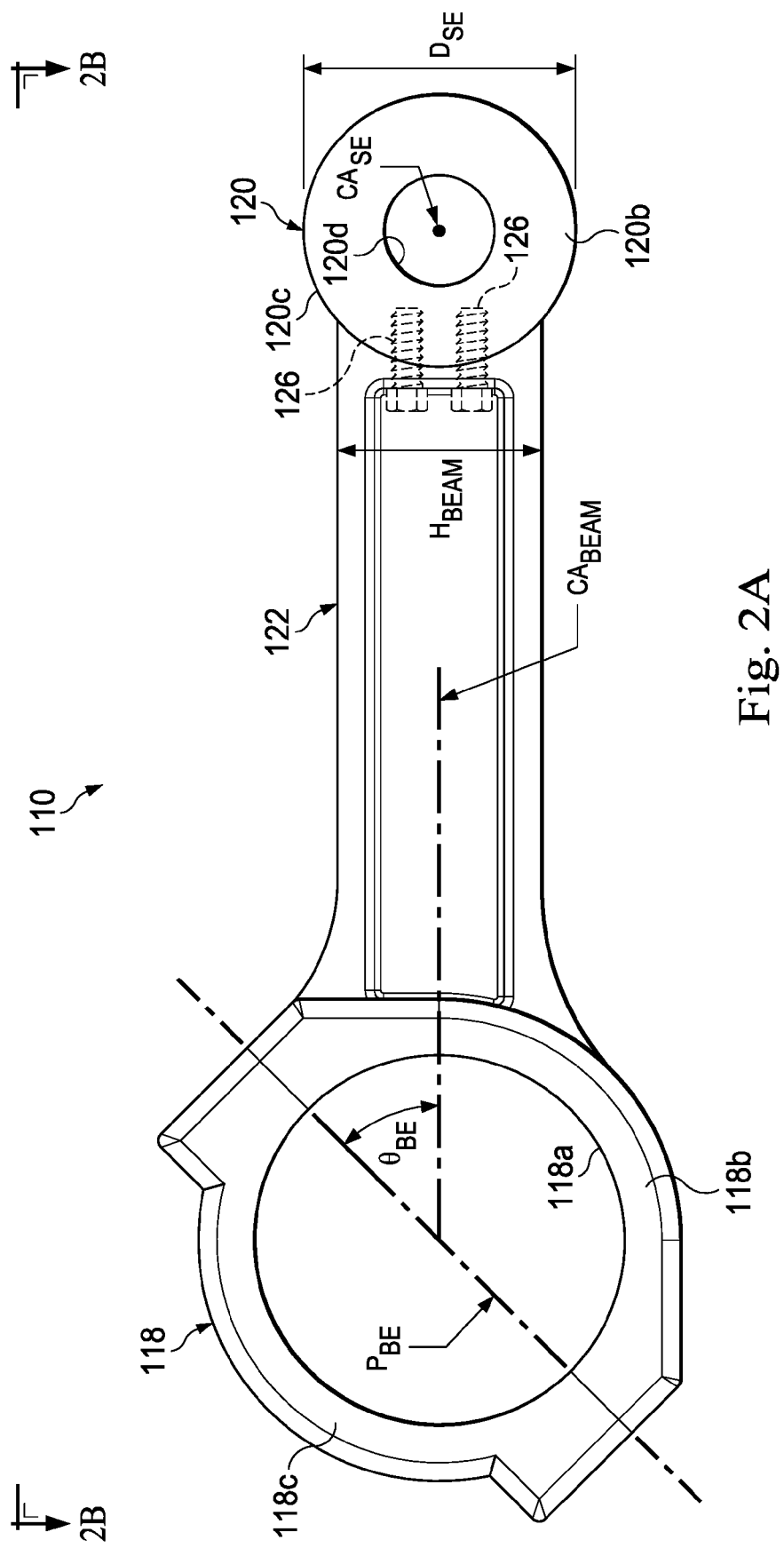
FIG. 2A is a side elevational view of the connecting rod of FIG. 1B, according to an exemplary embodiment.
Figure 2B:
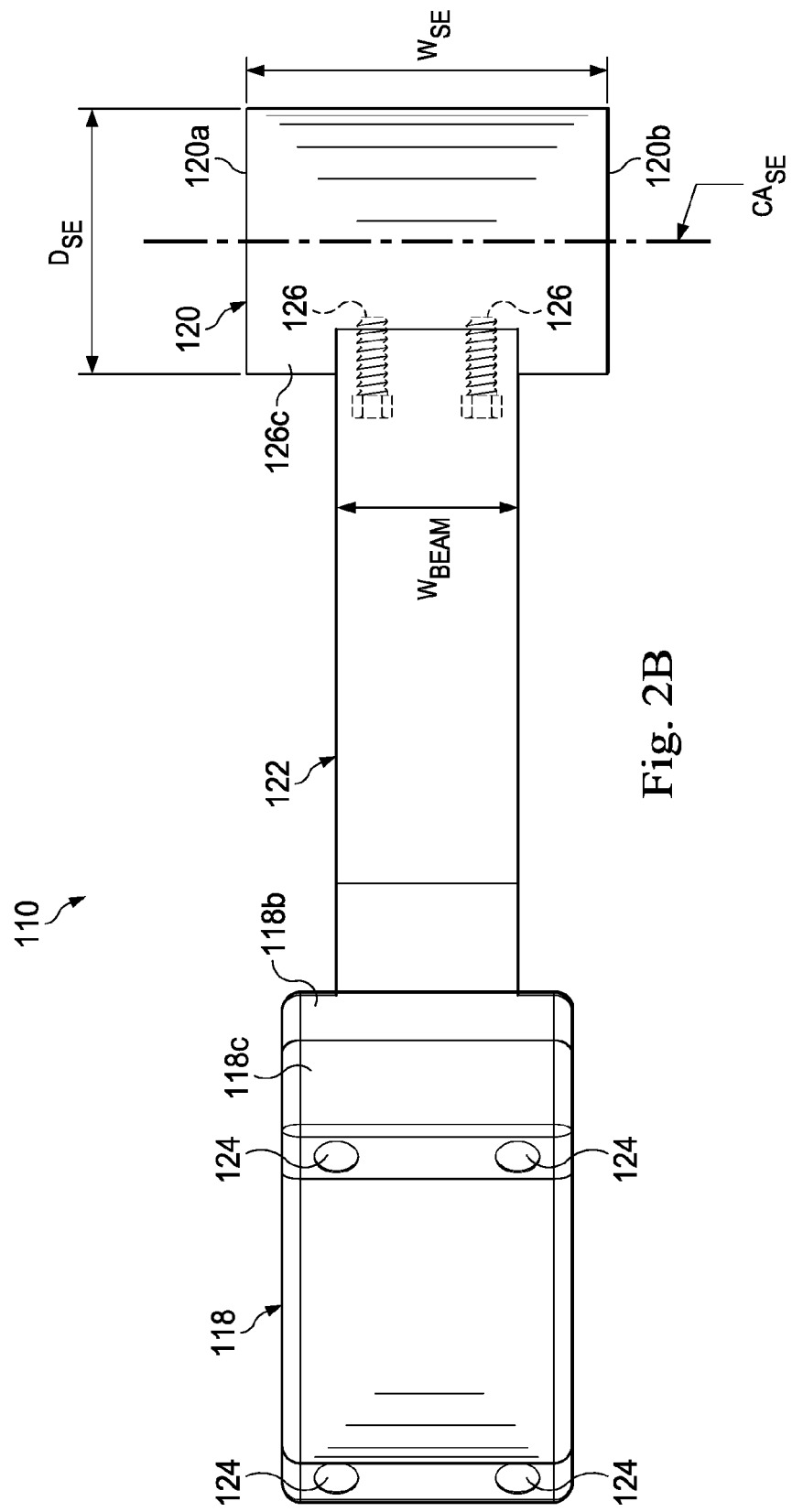
FIG. 2B is a top view of the connecting rod of FIGS. 1B and 2A, according to an exemplary embodiment.

In an exemplary embodiment, as illustrated in FIGS. 2A and 2B with continuing reference to FIGS. 1A and 1B, the connecting rod 110 includes a big end 118, a small end 120, and a beam portion 122. The beam portion 122 connects the big end 118 to the small end 120 and is adapted to transfer tensile and compressive loads therebetween. The beam portion 122 defines a central axis $CA_{BEAM}$ and has a height $H_{BEAM}$ and a width $W_{BEAM}$. In several exemplary embodiments, the beam portion 122 is an I-beam.

The big end 118 defines a cylindrical inner surface 118a and is split along a plane $P_{BE}$ into a seat 118b and a cap 118c, as shown in FIG. 2A. The plane $P_{BE}$ forms an oblique angle $\Theta_{BE}$ with the central axis $CA_{BEAM}$ of the beam portion 122. In several exemplary embodiments, the angle $\Theta_{BE}$ is less than ninety degrees. The seat 118b and the cap 118c define complementary segments of the cylindrical inner surface 118a and are adapted to be connected to one another along the plane $P_{BE}$. In several exemplary embodiments, the seat 118b is integrally formed with the beam portion 122. One or more fasteners 124 connect the cap 118c to the seat 118b. The inner surface 118a is adapted to circumscribe the crank throw 26a when the cap 118c is connected to the seat 118b, thereby coupling the connecting rod 110 to the crankshaft 26. The seat 118b and the cap 118c may include a bearing (not shown) that provides lubrication and/or wear resistance between the crank throw 26a and the inner surface 118a of the big end 118.

The small end 120 is generally cylindrical in shape and includes opposing end portions 120a and 120b. The small end 120 is formed separately from the beam portion 122, to which the small end 120 is adapted to be connected. One or more fasteners 126 connect the small end 120 to the beam portion 122. Accordingly, the small end 120 may include threaded holes (not shown) with which the fasteners 126 are engaged. The small end 120 defines a central axis $CA_{SE}$ and a cylindrical bearing surface 120c having a width $W_{SE}$ and a diameter $D_{SE}$. The cylindrical bearing surface 120c is adapted to rotate relative to the crosshead 112. In several exemplary embodiments, an opening 120d is formed through the small end 120 along the central axis $CA_{SE}$. The diameter $D_{SE}$ of the small end 120 is greater than the height $H_{BEAM}$ of the beam portion 122, as shown in FIG. 2A. Further, the width $W_{SE}$ of the small end 120 is greater than the width $W_{BEAM}$ of the beam portion 122, as shown in FIG. 2B.

In an exemplary embodiment, as illustrated in FIGS. 3A and 3B with continuing reference to FIGS. 1A, 1B, 2A, and 2B, the crosshead 112 includes a pair of arcuate contact surfaces 128 and 130 connected by a main body 132 having a height $H_{BODY}$ and a width $W_{BODY}$. The main body 132 defines side portions 132a and 132b. In an exemplary embodiment, the width $W_{BODY}$ of the main body 132, from the side portion 132a to the side portion 132b, is substantially equal to the width $W_{SE}$ of the small end 120. In several exemplary embodiments, the width $W_{BODY}$ of the main body 132 is relatively greater than the width $W_{SE}$ of the small end 120. The arcuate contact surfaces 128 and 130 are adapted to slidingly engage the tubular guide member 116 during the operation of the reciprocating pump assembly 10. A cylindrical bore 134 is formed through the main body 132, including the side portions 132a and 132b. The cylindrical bore 134 defines a bearing surface 136 in the main body 132 extending about a central axis $CA_{BORE}$. The bearing surface 136 is adapted to extend circumferentially about the cylindrical bearing surface 120c of the small end 120, thereby coupling the crosshead 112 to the connecting rod 110. A window 138, having a height $H_W$ and a width $W_W$, is formed in the main body 132 transversely to the central axis $CA_{BORE}$, extending through the wall of the main body 132 and into the cylindrical bore 134 in a direction that is generally perpendicular to the central axis $CA_{BORE}$. The height $H_W$ and the width $W_W$ of the window 138 are relatively greater than the respective height $H_{BEAM}$ and the width $W_{BEAM}$ of the beam portion 122 adjacent the small end 120 of the connecting rod 110. The window 138 is adapted to accommodate pivotal movement of the beam portion 122 of the connecting rod 110 relative to the crosshead 112. The width $W_W$ of the window 138 is less than the width $W_{BODY}$ of the main body 132. Similarly, the height $H_W$ of the window 138 is less than the height $H_{BODY}$ of the main body 132. As a result, the main body 132 defines a pair of struts 140 and 142 extending between the arcuate contact surfaces 128 and 130 of the crosshead 112 on opposite sides of the window 136. The struts 140 and 142 each define a portion of the bearing surface 136 formed in the main body 132 by the cylindrical bore 134. The window 138 defines an angle $\Theta_W$ about the central axis $CA_{BORE}$ of the cylindrical bore 134, as shown in FIG. 3B. The angle $\Theta_W$ is less than 180 degrees. Thus, at the location of the window 138, the bearing surface 136 extends more than 180 degrees, but less than 360 degrees, about the central axis $CA_{BORE}$ of the cylindrical bore 134. However, at the locations of the struts 140 and 142, the bearing surface 136 extends 360 degrees about the central axis $CA_{BORE}$ of the cylindrical bore 134. The pony rod 114 is adapted to be connected to an end portion 132c of the main body 132 of the crosshead 112, opposite the window 138 (best shown in FIG. 1).

Figure 4A:
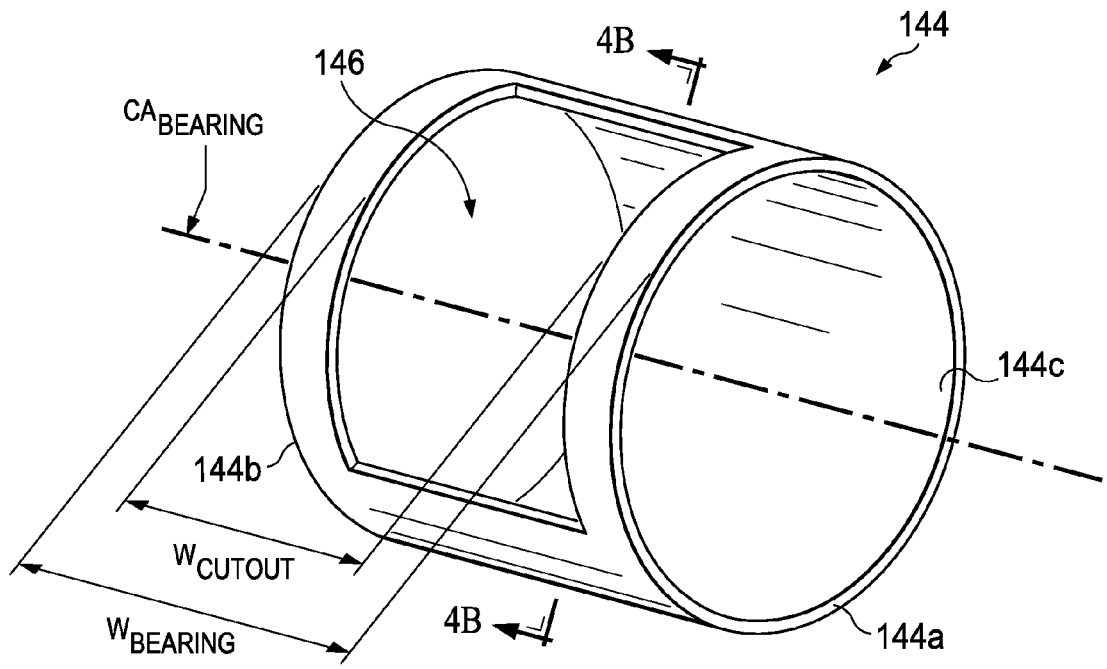
FIG. 4A is a perspective view of a sleeve bearing adapted to form a portion of the mechanical linkage of FIG. 1B, according to an exemplary embodiment.
Figure 4B:
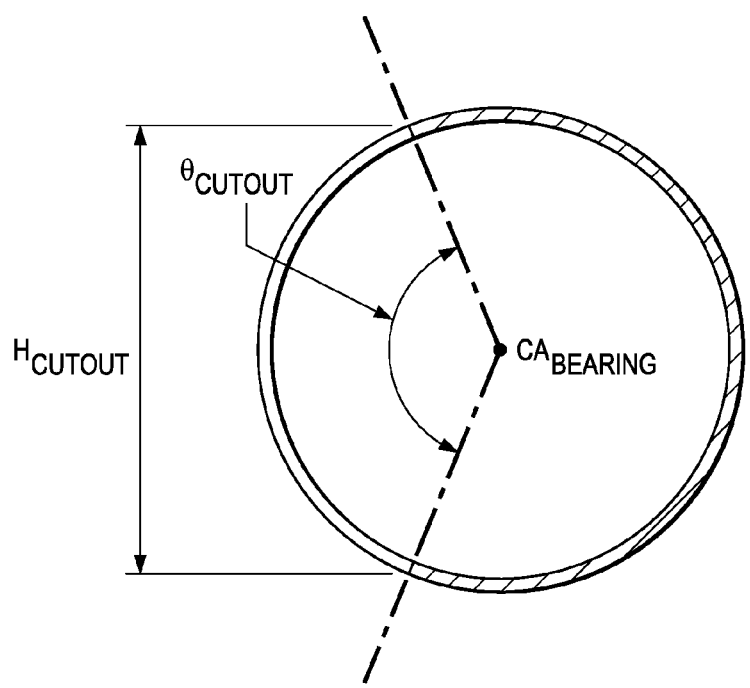
FIG. 4B is a side cross-sectional view of the sleeve bearing of FIG. 4A, according to an exemplary embodiment.

In an exemplary embodiment, as illustrated in FIGS. 4A and 4B with continuing reference to FIGS. 2A, 2B, 3A, and 3B, the mechanical linkage 100 includes a sleeve bearing 144 that provides lubrication and/or wear resistance between the bearing surface 136 of the crosshead 112 and the small end 120 of the connecting rod 110. The sleeve bearing 144 is a tubular body defining opposing end portions 144a and 144b and an interior passage 144c. Further, the sleeve bearing 144 has a width $W_{BEARING}$ and a central axis $CA_{BEARING}$, as shown in FIG. 4A. In an exemplary embodiment, the width $W_{BEARING}$ of the sleeve bearing 144 is substantially equal to the width $W_{SE}$ of the small end 120 of the connecting rod 110. In several exemplary embodiments, the width $W_{BEARING}$ of the sleeve bearing 144 is substantially equal to width $W_{BODY}$ of the main body 132 of the crosshead 112. A generally rectangular cutout 146, having a height $H_{CUTOUT}$ and a width $W_{CUTOUT}$, is formed in the sleeve bearing 144 transversely to the central axis $CA_{BEARING}$. The height $H_{CUTOUT}$ and the width $W_{CUTOUT}$ of the cutout 146 are relatively greater than the respective height $H_{BEAM}$ and width $W_{BEAM}$ of the beam portion 122 adjacent the small end 120 of the connecting rod 110. In several exemplary embodiments, the height $H_{CUTOUT}$ and the width $W_{CUTOUT}$ of the cutout 146 are substantially equal to the respective height $H_W$ and width $W_W$ of the window 138 of the crosshead 112. As a result, the cutout 146 is adapted to be substantially aligned with the window 138. Further, the cutout 146 is adapted to accommodate pivotal movement of the beam portion 122 of the connecting rod 110. The cutout 146 defines an angle $\Theta_{CUTOUT}$ about the central axis $CA_{BEARING}$ of the sleeve bearing 144, as shown in FIG. 4B. The angle $\Theta_{CUTOUT}$ is less than 180 degrees. Thus, at the location of the cutout 146, the sleeve bearing 144 extends more than 180 degrees, but less than 360 degrees, about the central axis $CA_{BEARING}$ of the sleeve bearing 144. However, at the locations of the end portions 144a and 144b, the sleeve bearing 144 extends 360 degrees about the central axis $CA_{BEARING}$ of the sleeve bearing 144.

Figure 5:
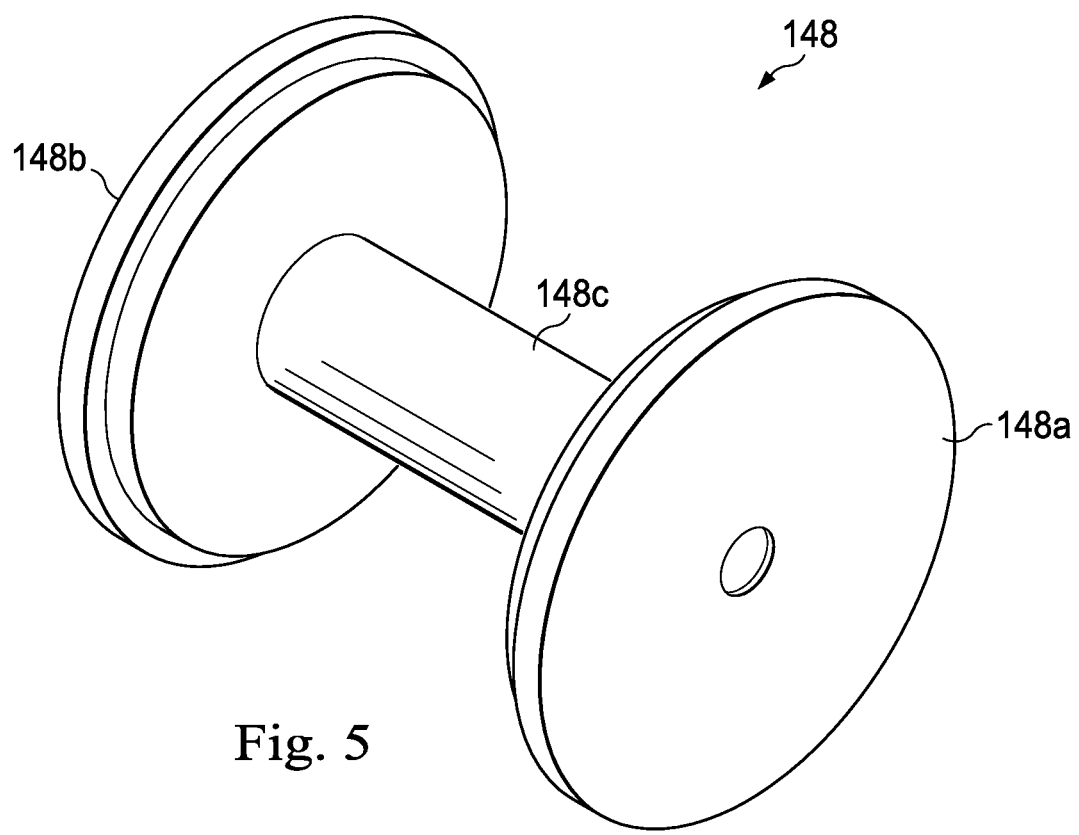
FIG. 5 is a perspective view of a clamp adapted to form a portion of the mechanical linkage of FIG. 1B, according to an exemplary embodiment.

In an exemplary embodiment, as illustrated in FIG. 5, the mechanical linkage 100 includes a clamp 148 adapted to extend axially through the opening 120d of the small end 120 and engage the side portions 132a and 132b of the crosshead 112 and the end portions 120a and 120b of the small end 120. The clamp 148 includes a pair of end plates 148a and 148b connected by a tensioner 148c. The end plate 148a is adapted to engage the end portion 120a of the small end 120 and the side portion 132a of the crosshead 112. Similarly, the end plate 148b is adapted to engage the end portion 120b of the small end 120 and the side portion 132b of the crosshead 112. The tensioner 148c is adapted to extend through the opening 120d of the small end 120. Further, the tensioner 148c is adapted to be placed in tension between the end plates 148a and 148b, thereby applying a clamp force on the end portions 120a and 120b of the small end 120 and the side portions 132a and 132b of the crosshead 112. Thus, the clamp 148 is adapted to prevent, or at least reduce, axial displacement of the small end 120 within the sleeve bearing 144 and relative to the crosshead 112.

Figure 6:
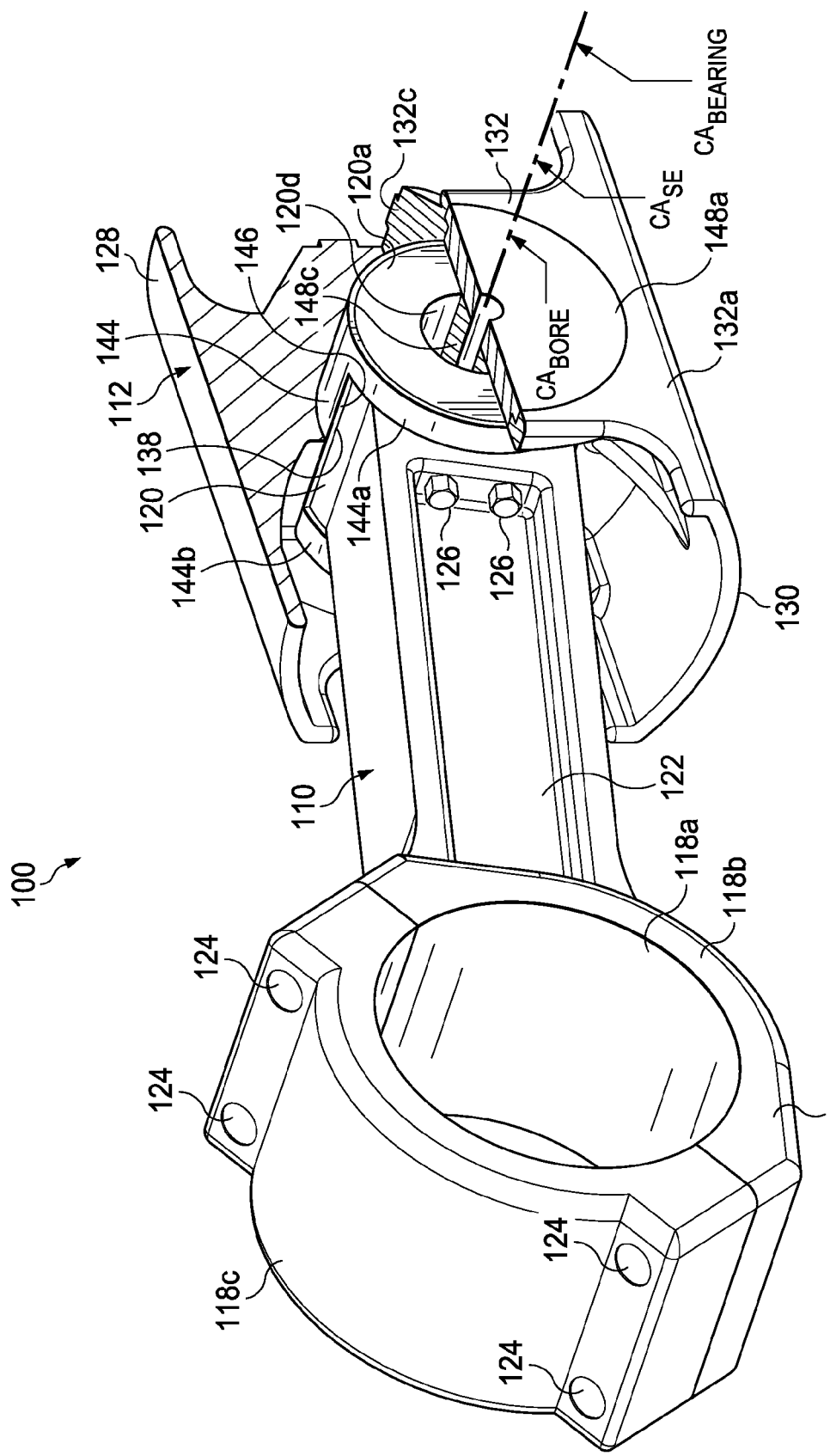
FIG. 6 is a partial sectional view of the assembled mechanical linkage of FIG. 1B, the assembled mechanical linkage including the connecting rod of FIGS. 2A and 2B, the crosshead of FIGS. 3A and 3B, the sleeve bearing of FIGS. 4A and 4B, and the clamp of FIG. 5, according to an exemplary embodiment.

Referring to FIG. 6, with continuing reference to FIGS. 2A, 2B, 3A, 3B, 4A, and 4B, the mechanical linkage 100 is depicted in an assembled configuration. The small end 120 of the connecting rod 110 is coupled to the crosshead 112 and the big end 118 is adapted to be coupled to the crank throw 26a. Specifically, the fasteners 124 are adapted to connect the cap 118c to the seat 118b of the big end 118 so that the cylindrical inner surface 118a of the big end 118 circumscribes the crank throw 26a. The small end 120 of the connecting rod 110 extends within the cylindrical bore 134 of the main body 132 of the crosshead 112. The end portions 120a and 120b of the small end 120 are substantially aligned with the respective side portions 132a and 132b of the main body 132 of the crosshead 112. The sleeve bearing 144 also extends within the cylindrical bore 134, radially between the bearing surface 136 of the crosshead 112 and the cylindrical bearing surface 120c of the small end 120. The cutout 146 of the sleeve bearing 144 is substantially aligned with the window 138 of the crosshead 112. Further, the end portions 144a and 144b of the sleeve bearing 144 are substantially aligned with the respective side portions 132a and 132b of the main body 132 of the crosshead 112. The bearing surface 136 of the crosshead 112 engages the sleeve bearing 144 and prevents, or at least obstructs, movement of the sleeve bearing 144 relative to the crosshead 112. In the assembled configuration, the central axis $CA_{BORE}$ of the cylindrical bore 134, the central axis $CA_{SE}$ of the small end 120, and the central axis $CA_{BEARING}$ of the sleeve bearing 144 are aligned so as to be substantially coaxial. The tensioner 148c of the clamp 148 extends axially through the opening 120d of the small end 120 and connects to the end plates 148a and 148b, which engage the side portions 132a and 132b of the crosshead 112 and the end portions 120a and 120b of the small end 120. Thus, the clamp 148 prevents, or at least reduces, axial displacement of the small end 120 within the sleeve bearing 144 and relative to the crosshead 112. The beam portion 122 is connected to the small end 120 via the fasteners 126 and extends through both the window 138 of the crosshead 112 and the cutout 146 of the sleeve bearing 144. The window 138 and the cutout 146 are sized to permit the beam portion 122 to pivot about the central axis $CA_{SE}$ of the small end 120 and relative to the crosshead 112. The arcuate contact surfaces 128 and 130 of the crosshead 112 are adapted to slidingly engage the tubular guide member 116, within which the crosshead 112 reciprocates during the operation of the reciprocating pump assembly 10. The pony rod 114 connects the end portion 132c of the main body 132 of the crosshead 112 to the plunger 24, which is adapted to reciprocate within the plunger bore 18 (best shown in FIG. 1).

In operation, the motor (not shown) drives the gear train 28. The gear train 28, in turn, rotates the crankshaft 26, including the main shaft 26b and the crank throws 26a. The mechanical linkages 100 convert the rotating motion of the crank throws 26a into reciprocating linear motion of the corresponding plungers 24 within the plunger bores 18. During the suction stroke of each mechanical linkage 100 (i.e. when the plunger 24 is displaced away from the fluid end 12), fluid is drawn from the suction manifold 20 into the corresponding plunger bore 18. Similarly, during the discharge stroke of each mechanical linkage 100 (i.e., when the plunger 24 is displaced toward the fluid end 12), fluid is discharged into the discharge manifold 22 from the corresponding plunger bore 18. As indicated above, each of the mechanical linkages 100 are substantially identical to one another. Therefore, only one of the mechanical linkages 100 will be described below in connection with the operation of the reciprocating pump assembly 10. Accordingly, during operation, as the crankshaft 26 rotates, the crank throw 26a imparts rotating motion to the big end 118 of the connecting rod 110. The rotating motion of the big end 118 is transferred to the small end 120 and, consequently, the crosshead 112, through the beam portion 122. The tubular guide member 116 only permits linear displacement of the crosshead 112. As a result, the rotating motion of the crank throw 26a is converted into linear reciprocating motion of the crosshead 112 within the tubular guide member 116. As the crosshead 112 reciprocates, the arcuate contact surfaces 128 and 130 of the crosshead 112 are in sliding contact with the tubular guide member 116. The rotating motion of the big end 118 of the connecting rod 110 and the resulting linear motion of the crosshead 112 cause the beam portion 122 of the connecting rod 110 to pivot back and forth relative to the crosshead 112. The window 138 of the crosshead 112 and the cutout 146 of the sleeve bearing 144 accommodate the back and forth pivoting of the beam portion 122 relative to the crosshead 112. Moreover, the pivoting of the beam portion 122 relative to the crosshead 112 causes the small end 120 of the connecting rod 110 to rotate back and forth within the sleeve bearing 144 while remaining engaged therewith. As the small end 120 rotates back and forth within the sleeve bearing 144, the clamp 148 prevents axial displacement of the small end 120 relative to the sleeve bearing 144 and the crosshead 112. Further, the sleeve bearing 144 is prevented, or at least obstructed, from rotating relative to the bearing surface 136 of the crosshead 112. The bearing surface 136 is partially defined by the struts 140 and 142. As a result, the struts 140 and 142 carry a portion of the load imparted to the crosshead 112 during the suction stroke of the mechanical linkage 100. Another portion of the bearing surface 136, which is not defined by the struts 140 and 142, carries the remaining portion of the load imparted to the crosshead 112 during the suction stroke. The pony rod 114 transmits the reciprocating motion of the crosshead 112, within the tubular guide member 116, to the plunger 24. As a result, plunger 24 reciprocates within the plunger bore 18, drawing fluid from the suction manifold 20 and discharging the fluid into the discharge manifold 22.

Figure 7:
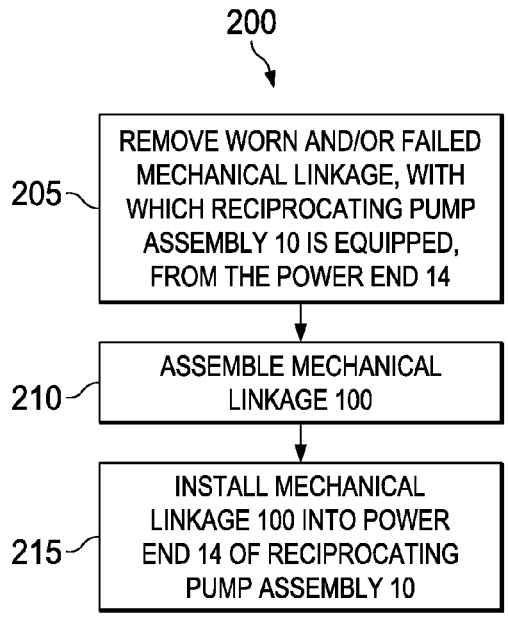
FIG. 7 is a flow-chart diagram illustrating a method for assembling the mechanical linkage of FIG. 6, the method including retrofitting the reciprocating pump assembly with the mechanical linkage, according to an exemplary embodiment.

In an exemplary embodiment, as illustrated in FIG. 7, a method of retrofitting the reciprocating pump assembly 10 with the mechanical linkage 100 is generally referred to by the reference numeral 200. The power end 14 of the reciprocating pump assembly 10 may be equipped with one or more mechanical linkages having components that are subject to wear and/or failure during the operation of the reciprocating pump assembly 10. Thus, the one or more mechanical linkages with which the power end 14 is equipped are in need of periodic replacement due to maintenance and/or reliability issues. The method 200 may be used to replace a worn and/or failed mechanical linkage of the reciprocating pump assembly 10 with the mechanical linkage 100. In some instances, the method 200 improves the mean time between failures (MTBF) of the reciprocating pump assembly 10. In some instances, the method 200 increases the pressure capacity and/or the flow capacity of the reciprocating pump assembly 10. The method 200 includes removing a worn and/or failed mechanical linkage, with which the reciprocating pump assembly 10 is equipped, from the power end 14 at step 205; assembling the mechanical linkage 100 at step 210; and installing the mechanical linkage 100 into the power end 14 at step 215.

At the step 205, as shown in FIG. 7, the worn and/or failed mechanical linkage with which the reciprocating pump assembly 10 is equipped is removed from the power end 14. In an exemplary embodiment, the mechanical linkage is removed by first decoupling the pony rod 114 from the plunger 24 and the worn and/or failed mechanical linkage. The front and rear access covers 30a and 30b located proximate the worn and/or failed mechanical linkage are then removed from the power end housing 30 to provide access to the various components of the mechanical linkage through the portholes (not shown). The mechanical linkage is accessed through the portholes and decoupled from the crank throw 26a of the crankshaft 26. In several exemplary embodiments, the mechanical linkage is accessed simultaneously through multiple portholes, corresponding to the front and rear covers 30a and 30b, in order to decouple it from the crank throw 26a. Finally, the worn and/or failed mechanical linkage is removed from the reciprocating pump assembly 10, either through the tubular guide member 116 of the power end 114 or through the portholes corresponding to the front and/or rear covers 30a and 30b of the power end housing 30.

Figure 8:
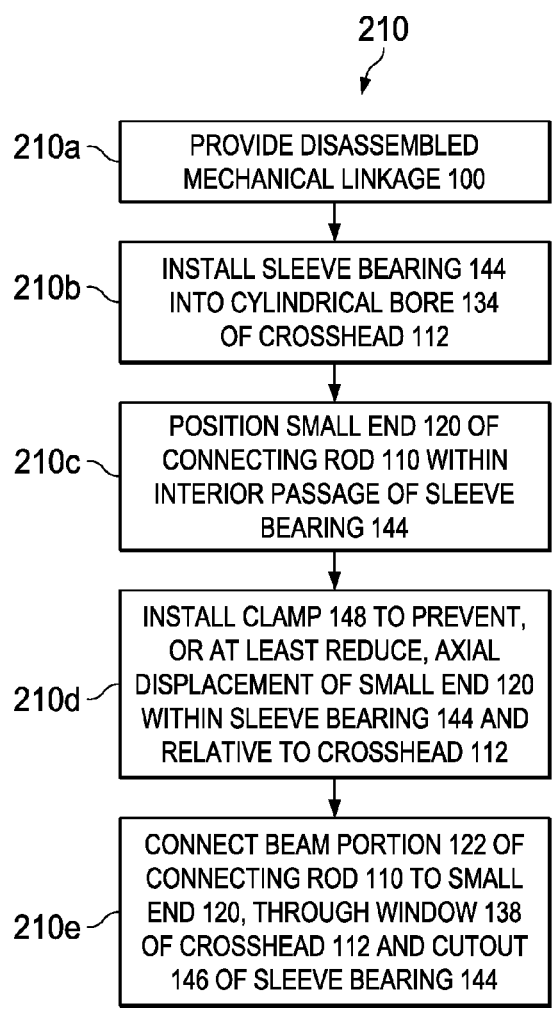
FIG. 8 is a flow-chart diagram of a step of the method of FIG. 7, according to an exemplary embodiment.

In an exemplary embodiment of the step 210, as illustrated in FIG. 8 with continuing reference to FIG. 7, assembling the mechanical linkage 100 includes providing a disassembled mechanical linkage 100 at step 210a; installing the sleeve bearing 144 into the cylindrical bore 134 of the crosshead 112 at step 210b; positioning the small end 120 of the connecting rod 110 within the interior passage of the sleeve bearing 144 at step 210c; installing the clamp 148 to prevent, or at least reduce, axial displacement of the small end 120 within the sleeve bearing 144 and relative to the crosshead 112 at step 210d; and connecting the beam portion 122 of the connecting rod 110 to the small end 120, through the window 138 of the crosshead 112 and the cutout 146 of the sleeve bearing 144, at step 210e.

At the step 210a, as shown in FIG. 8, a disassembled mechanical linkage 100 is provided, including the crosshead 112, the connecting rod 110, the sleeve bearing 144, and the clamp 148. The crosshead 112 and sleeve bearing 144 are provided separately from one another. Further, the connecting rod 110 is provided with the small end 120 detached from the beam portion 122. Similarly, the clamp 148 is provided with at least one of the end plates 148a and 148b detached from the tensioner 148c. In several exemplary embodiments, the mechanical linkage 100 is provided without the sleeve bearing 144. In several exemplary embodiments, the mechanical linkage 100 is provided without the clamp 148.

At the step 210b, as shown in FIG. 8, the sleeve bearing 144 is installed within the cylindrical bore 134 of the crosshead 112. The sleeve bearing 144 is introduced axially into the cylindrical bore 134 and positioned so that the cutout 146 of the sleeve bearing 144 is substantially aligned with the window 138 of the crosshead 112. In several exemplary embodiments, the sleeve bearing 144 is also positioned so the end portions 144a and 144b of the sleeve bearing 144 are substantially aligned with the respective side portions 132a and 132b of the main body 132 of the crosshead 112. In several exemplary embodiments, the sleeve bearing 144 substantially covers the bearing surface 136 when the cutout 146 is substantially aligned with the window 138. Once the sleeve bearing 144 is properly positioned, the bearing surface 136 of the crosshead 112 engages the sleeve bearing 144 to prevent, or at least obstruct, the sleeve bearing 144 from shifting or slipping relative to the crosshead 112. In an exemplary embodiment, the sleeve bearing 144 is shrunk-fit into the cylindrical bore 134 so that an interference fit is established between the sleeve bearing 144 and the bearing surface 136 of the crosshead 112. In another exemplary embodiment, the sleeve bearing 144 is press-fit into the cylindrical bore 134 in order to establish an interference fit. In several exemplary embodiments, the sleeve bearing 144 also includes one or more retainers (not shown), such as, for example, set screws and/or retaining rings, to further prevent, or at least obstruct, the sleeve bearing 144 from slipping or shifting relative to the bearing surface 136 of the crosshead 112. In several exemplary embodiments, the step 210b of installing the sleeve bearing 144 is omitted from the method 200.

At the step 210c, as shown in FIG. 8, the small end 120 of the connecting rod 110 is positioned within the interior passage 144c of the sleeve bearing 144. The small end 120 is introduced axially into the interior passage 144c and positioned so that the cylindrical bearing surface 120c of the small end 120 is accessible through both the window 138 of the crosshead 112 and the cutout 146 of the sleeve bearing 144. In several exemplary embodiments, the small end 120 is positioned so that the end portions 120a and 120b are substantially aligned with the respective side portions 132a and 132b of the main body 132 of the crosshead 112. In several exemplary embodiments, the small end 120 is positioned so that the end portions 120a and 120b are substantially aligned with the respective end portions 144a and 144b of the sleeve bearing 144. The sleeve bearing 144 engages the cylindrical bearing surface 120c of the small end 120 and maintains the substantially coaxial relation of the central axis $CA_{SE}$ of the small end 120 with the central axis $CA_{BEARING}$ of the sleeve bearing 144. A clearance fit is established between the small end 120 and the sleeve bearing 144, thereby permitting the small end 120 to rotate back and forth within the sleeve bearing 144 while remaining engaged therewith. In several exemplary embodiments, the step 210b of installing the sleeve bearing 144 is omitted, and the step 210d is performed by positioning the small end 120 within the internal bore 136 of the crosshead 112, thereby establishing a clearance fit between the cylindrical bearing surface 120c of the small end 120 and the bearing surface 136 of the crosshead 112.

At the step 210d, as shown in FIG. 8, the clamp 148 is installed to prevent, or at least reduce, axial displacement of the small end 120 within the sleeve bearing 144 and relative to the crosshead 112. The tensioner 148c of the clamp 148 is introduced axially through the opening 120d of the small end 120. The end plates 148a and 148b are connected to the tensioner 148c. The end plate 148a engages the end portion 120a of the small end 120 and the side portion 132a of the crosshead 112. Similarly, the end plate 148b engages the end portion 120b of the small end 120 and the side portion 132b of the crosshead 112. The tensioner 148c is placed in tension between the end plates 148a and 148b, thereby applying a clamp force on the end portions 120a and 120b of the small end 120 and the side portions 132a and 132b of the crosshead 112. The clamp force applied by the tensioner 148c prevents, or at least reduces, axial displacement of the small end 120 relative to the sleeve bearing 144 and the crosshead 112. In several exemplary embodiments, the step 210d of installing the clamp 148 is omitted from the method 200.

At the step 210e, as shown in FIG. 8, the beam portion 122 of the connecting rod 110 is connected to the small end 120 through both the window 138 of the crosshead 112 and the cutout 146 of the sleeve bearing 144. Once the small end 120 is positioned within the interior passage 144c of the sleeve bearing 144, the beam portion 122 is introduced through the window 138 of the crosshead 112 and the cutout 146 of the sleeve bearing 144. The beam portion 122 is connected to the small end 120 with the fasteners 126. The window 138 and the cutout 146 are adapted to accommodate pivotal movement of the beam portion 122 during the operation of the reciprocating pump assembly 10. In an exemplary embodiment, the step 210e of connecting the beam portion 122 to the small end 120 is performed before the step 215 of installing the mechanical linkage 100 into the power end 14. In several exemplary embodiments, the step 210e is performed during and/or after the step 215, as will be discussed in further detail below.

Figure 9:
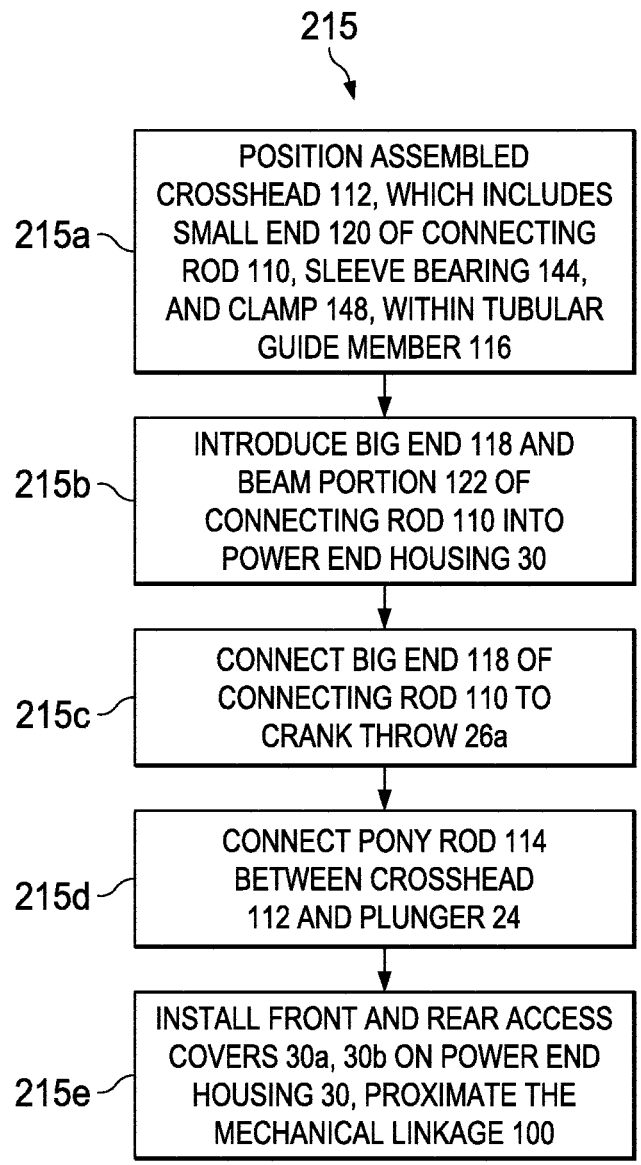
FIG. 9 is a flow-chart diagram of another step of the method of FIG. 7, according to an exemplary embodiment.

In an exemplary embodiment of the step 215, as illustrated in FIG. 9 with continuing reference to FIG. 7, installing the mechanical linkage 100 into the power end 14 includes positioning the assembled crosshead 112, which includes the small end 120 of the connecting rod 110, the sleeve bearing 144, and the clamp 148, within the tubular guide member 116 at step 215a; introducing the big end 118 and the beam portion 122 of the connecting rod 110 into the power end housing 30 at step 215b; connecting the big end 118 of the connecting rod 110 to the crank throw 26a at step 215c; connecting the pony rod 114 between the crosshead 112 and the plunger 24 at step 215d; and installing the front and rear access covers 30a and 30b on the power end housing 30, proximate the mechanical linkage 100, at step 215e.

At the step 215a, as shown in FIG. 9, the assembled crosshead 112, which includes the small end 120 of the connecting rod 110, the sleeve bearing 144, and the clamp 148, is positioned within the tubular guide member 116. The assembled crosshead 112 may be positioned within the tubular guide member 116 through the portholes corresponding to the front and rear access covers 30a and 30b and/or through the tubular guide member 116 itself. In an exemplary embodiment, the step 210e of connecting the beam portion 122 to the small end 120 is performed before the step 215a of positioning the assembled crosshead 112, including the small end 120, the sleeve bearing 144, and the clamp 148 within the tubular guide member 116. In several exemplary embodiments, the step 210e is performed after the step 215a.

At the step 215b, as shown in FIG. 9, the big end 118 and the beam portion 122 of the connecting rod 110 are introduced into the power end housing 30. The beam portion 122 and the big end 118 may be introduced into the power end housing through the tubular guide member 116 and/or through the portholes corresponding to the front and rear access covers 30a and 30b. In an exemplary embodiment, the step 210e of connecting the beam portion 122 to the small end 120 is performed before the step 215b of introducing the big end 118 and the beam portion 122 into the power end housing 30. In several exemplary embodiments, the step 210e is performed after the step 215b.

At the step 215c, as shown in FIG. 9, the big end 118 of the connecting rod 110 is connected to the crank throw 26a. The seat 118b of the big end 118 defines a segment of the cylindrical inner surface 118a, which segment is positioned to engage the crank throw 26a. The cap 118a of the big end 118 defines a complementary segment of the cylindrical inner surface 118a, which segment is also positioned to engage the crank throw 26a. Once the corresponding segments of the cylindrical inner surface 118a are positioned to engage the crank throw 26a, the cap 118c is connected to the seat 118b using the fasteners 124. In several exemplary embodiments, the oblique angle $\Theta_{BE}$, along which the cylindrical inner surface 118a of the big end 118 is split, allows the cap 118a and the seat 118b to be connected by accessing the big end 118 through only one of the portholes corresponding to the front and rear access covers 30a and 30b. In several exemplary embodiments, the step 210e of connecting the beam portion 122 to the small end 120 is performed before the step 215c of connecting the big end 118 of the connecting rod 110 to the crank throw 26a. In an exemplary embodiment, the step 210e is performed after the step 215c.

At the step 215d, as shown in FIG. 9, the pony rod 114 is connected between the crosshead 112 and the plunger 24. Specifically, the end portion 132b of the main body 132 of the crosshead 112 is connected to the pony rod 114. The pony rod 114, in turn, is connected to the plunger 24. Finally, at the step 215e, the front and rear access covers 30a and 30b are installed on the power end housing 30, proximate the mechanical linkage 100. The front and rear access covers 30a and 30b cover the portholes used to access the power end 14. Once the steps 215d and 215e are completed, the mechanical linkage 100 is fully installed and the reciprocating pump assembly 10 is ready for service.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An apparatus for a reciprocating pump assembly, the apparatus comprising:
   a crosshead comprising: a main body; a cylindrical bore formed through, and at least partially defining a first bearing surface in, the main body, the first bearing surface extending about a first axis; and a window formed in the main body transversely to the first axis, wherein, at the location of the window, the first bearing surface of the crosshead extends more than 180 degrees but less than 360 degrees about the first axis;
   a connecting rod comprising a cylindrical small end defining opposing end portions and a cylindrical second bearing surface extending between the opposing end portions, the cylindrical small end extending about a second axis and being adapted to extend within the cylindrical bore, and a beam portion adapted to be connected to the cylindrical small end at the second bearing surface, the beam portion and the cylindrical small end being separately formed; and
   a clamp adapted to be connected to the main body of the crosshead to prevent, or at least reduce, axial displacement of the cylindrical small end along the second axis and relative to the crosshead;
   wherein, when the cylindrical small end extends within the cylindrical bore and the beam portion is connected to the cylindrical small end, the first and second axes are substantially coaxial and the beam portion extends through the window; and
   wherein the clamp is sized and shaped so that, when the cylindrical small end extends within the cylindrical bore and the clamp is connected to the main body of the crosshead, the clamp engages both the main body and the respective opposing end portions of the cylindrical small end.

2. The apparatus of claim 1, wherein the beam portion is adapted to be connected to the cylindrical small end using one or more fasteners.

3. The apparatus of claim 1, wherein the crosshead further comprises a pair of struts integrally formed with the main body and partially defining the first bearing surface, the struts being formed on opposing sides of the window.

4. The apparatus of claim 1, further comprising a bearing adapted to extend within the cylindrical bore, the bearing comprising a tubular body defining an interior passage and extending about a third axis, and a cutout formed in the tubular body transversely to the third axis, the cutout being adapted to be substantially aligned with the window so that the tubular body substantially covers the first bearing surface; wherein, when the bearing and the cylindrical small end extend within the cylindrical bore, the cutout is substantially aligned with the window, and the beam portion is connected to the cylindrical small end: the beam portion extends through both the cutout and the window; the bearing is disposed radially between the first bearing surface and the cylindrical small end, thus providing lubrication and/or wear resistance therebetween; and the first, second, and third axes are substantially coaxial.

5. The apparatus of claim 4, wherein, at the location of the cutout, the tubular body of the bearing extends more than 180 degrees, but less than 360 degrees, about the third axis.

6. The apparatus of claim 1, wherein the clamp comprises a pair of plates adapted to engage both the main body of the crosshead and the respective opposing end portions of the cylindrical small end, and a tensioner adapted to be connected to, and to apply tension between, the plates; wherein, when the plates engage both the main body of the crosshead and the opposing end portions of the cylindrical small end, and the tensioner is connected to, and applies tension between, the plates, the clamp prevents, or at least reduces, axial displacement of the cylindrical small end along the second axis and relative to the crosshead.

7. A method of assembling a crosshead and a connecting rod for a reciprocating pump, the method comprising:
   providing the crosshead, the crosshead comprising: a main body; a cylindrical bore formed through, and at least partially defining a first bearing surface in, the main body, the first bearing surface extending about a first axis; and a window formed in the main body transversely to the first axis, wherein, at the location of the window, the first bearing surface of the crosshead extends more than 180 degrees but less than 360 degrees about the first axis;
   positioning a cylindrical small end of the connecting rod within the cylindrical bore, the cylindrical small end defining opposing end portions and a cylindrical second bearing surface extending between the opposing end portions, and the cylindrical small end extending about a second axis;
   connecting a beam portion of the connecting rod to the cylindrical small end at the second bearing surface, the beam portion and the cylindrical small end being separately formed; and
   connecting a clamp to the main body of the crosshead to prevent, or at least reduce, axial displacement of the cylindrical small end along the second axis and relative to the crosshead;
   wherein, when the cylindrical small end is positioned within the cylindrical bore and the beam portion is connected to the cylindrical small end, the first and second axes are substantially coaxial and the beam portion extends through the window; and
   wherein the clamp is sized and shaped so that, when the cylindrical small end is positioned within the cylindrical bore and the clamp is connected to the main body of the crosshead, the clamp engages both the main body and the respective opposing end portions of the cylindrical small end.

8. The method of claim 7, wherein connecting the beam portion to the cylindrical small end of the connecting rod comprising connecting the beam portion to the cylindrical small end using one or more fasteners.

9. The method of claim 7, wherein the crosshead further comprises a pair of struts integrally formed with the main body and partially defining the first bearing surface, the struts being formed on opposing sides of the window.

10. The method of claim 7, further comprising positioning a bearing within the cylindrical bore so that: a tubular body of the bearing is engaged with the first bearing surface of the crosshead, the tubular body defining an interior passage and extending about a third axis; and a cutout of the bearing is substantially aligned with the window of the crosshead, the cutout formed in the tubular body transversely to the third axis; wherein, when the bearing and the cylindrical small end are positioned within the cylindrical bore and the beam portion is connected to the cylindrical small end: the beam portion extends through both the cutout and the window; the bearing is disposed radially between the first bearing surface and the cylindrical small end, thus providing lubrication and/or wear resistance therebetween; and the first, second, and third axes are substantially coaxial.

11. The method of claim 10, wherein, at the location of the cutout, the tubular body of the bearing extends more than 180 degrees, but less than 360 degrees, about the third axis.

12. The method of claim 7, wherein connecting the clamp to the crosshead comprises:

engaging a pair of plates of the clamp with both the main body of the crosshead and the respective opposing end portions of the cylindrical small end; and connecting a tensioner of the clamp to the plates so that the tensioner applies tension between the plates and the clamp prevents, or at least reduces, axial displacement of the cylindrical small end along the second axis and relative to the crosshead.

13. A reciprocating pump assembly, comprising:

a fluid end comprising a plunger bore and a plunger adapted to reciprocate within the plunger bore;

a power end comprising a tubular guide member, a crank shaft adapted to rotate about a first axis, and a crank throw offset from the first axis and connected to the crankshaft; and a mechanical linkage operably coupling the power end to the fluid end, the mechanical linkage comprising:

a crosshead comprising: a main body; a cylindrical bore formed through, and at least partially defining a first bearing surface in, the main body, the first bearing surface extending about a first axis; and a window formed in the main body transversely to the first axis, wherein the first bearing surface of the crosshead extends more than 180 degrees but less than 360 degrees about the first axis; and a connecting rod comprising a cylindrical small end defining opposing end portions and a cylindrical second bearing surface extending between the opposing end portions, the cylindrical small end extending about a second axis and within the cylindrical bore, and a beam portion connected to the cylindrical small end at the second bearing surface, the beam portion and the cylindrical small end being separately formed; and a clamp connected to the main body of the crosshead to prevent, or at least reduce, axial displacement of the cylindrical small end along the second axis and relative to the crosshead;

wherein the beam portion extends through the window and the first and second axes are substantially coaxial; and wherein the clamp is sized and shaped to engage both the main body and the respective opposing end portions of the cylindrical small end.

14. The reciprocating pump assembly of claim 13, wherein the beam portion is connected to the cylindrical small end using one or more fasteners.

15. The reciprocating pump assembly of claim 13, wherein the connecting rod further comprises a big end connected to the beam portion and split along a plane into a seat portion and a cap portion, the seat and cap portions together defining a cylindrical inner surface that engages the crank throw, the seat portion being integrally formed with the beam portion, the cap portion being connected to the seat portion along the plane, and the plane defining an oblique angle with the beam portion.

16. The reciprocating pump assembly of claim 13, wherein the crosshead further comprises a pair of struts integrally formed with the main body and partially defining the first bearing surface, the struts being formed on opposing sides of the window.

17. The reciprocating pump assembly of claim 13, further comprising a bearing adapted to extend within the cylindrical bore, the bearing comprising a tubular body defining an interior passage and extending about a third axis, and a cutout formed in the tubular body transversely to the third axis, the cutout being adapted to be substantially aligned with the window so that the tubular body substantially covers the first bearing surface; wherein, when the bearing and the cylindrical small end extend within the cylindrical bore, the cutout is substantially aligned with the window, and the beam portion is connected to the cylindrical small end: the beam portion extends through both the cutout and the window; the bearing is disposed radially between the first bearing surface and the cylindrical small end, thus providing lubrication and/or wear resistance therebetween; and the first, second, and third axes are substantially coaxial.

18. The reciprocating pump assembly of claim 13, wherein the clamp comprises: a pair of plates engaging both the main body of the crosshead and the respective opposing end portions of the cylindrical small end, and a tensioner connected to, and applying tension between, the plates to prevent, or at least reduce, axial displacement of the cylindrical small end along the second axis and relative to the crosshead.

* * * * *